United States Patent
Thangaraj et al.

(10) Patent No.: US 11,438,292 B1
(45) Date of Patent: Sep. 6, 2022

(54) METHOD AND APPARATUS FOR FILTERING UNDESIRED EMAIL MESSAGES

(71) Applicant: EMC IP Holding Company LLC, Hopkinton, MA (US)

(72) Inventors: Shankar Thangaraj, Bangalore (IN); Jaganathan Kannan, Bangalore (IN); Hung Dinh, Austin, TX (US); Shirley Coleman, Glounthaune (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/227,744

(22) Filed: Apr. 12, 2021

(51) Int. Cl.
| | |
|---|---|
| G06F 15/16 | (2006.01) |
| H04L 51/212 | (2022.01) |
| H04L 51/18 | (2022.01) |
| H04L 51/48 | (2022.01) |
| H04L 61/45 | (2022.01) |

(52) U.S. Cl.
CPC .......... H04L 51/212 (2022.05); H04L 51/18 (2013.01); H04L 51/48 (2022.05); H04L 61/4555 (2022.05)

(58) Field of Classification Search
CPC ......... H04L 51/12; H04L 51/18; H04L 51/28; H04L 61/1564; H04L 43/16; H04L 63/1483; G06Q 10/107
USPC .................................. 709/206, 224, 238
See application file for complete search history.

(56) References Cited

U.S. PATENT DOCUMENTS

| | | | | |
|---|---|---|---|---|
| 8,566,938 | B1 * | 10/2013 | Prakash | H04L 51/12 726/22 |
| 2003/0191969 | A1 * | 10/2003 | Katsikas | H04L 63/0245 726/12 |
| 2006/0277259 | A1 * | 12/2006 | Murphy | H04L 51/12 709/206 |
| 2008/0133682 | A1 * | 6/2008 | Chadwick | H04L 51/12 709/206 |
| 2009/0307320 | A1 * | 12/2009 | Golan | H04L 51/12 709/206 |
| 2017/0289083 | A1 * | 10/2017 | Eikenberry | H04L 51/12 |
| 2021/0264430 | A1 * | 8/2021 | Searl | G06Q 20/4016 |

* cited by examiner

Primary Examiner — Johnny B Aguiar
(74) Attorney, Agent, or Firm — Daly, Crowley, Mofford & Durkee, LLP

(57) ABSTRACT

A method, including: receiving an email message, the email message being generated by a computing device; detecting whether a condition associated with the email message is satisfied, the condition including a condition for detecting whether the email message is sent by an automailer that is executing on the computing device; forwarding the email message to an email server, when the condition is satisfied; and discarding the email message, when the condition is not satisfied.

8 Claims, 9 Drawing Sheets

METHOD AND APPARATUS FOR FILTERING UNDESIRED EMAIL MESSAGES

BACKGROUND

Email is one of the most widely and commonly used internet services. The email infrastructure employed on the Internet primarily consists of email servers using Simple Mail Transfer Protocol (SMTP) to accept messages from clients, transport those messages to other servers, and deposit them into a user's server-based inbox. In addition to email servers, the infrastructure includes email clients. Clients retrieve email from their server-based inboxes using Post Office Protocol version 3 (POP3) or Internet Message Access Protocol (IMAP). Clients communicate with email servers using SMTP. Many Internet-compatible email systems rely on the X.400 standard for addressing and message handling.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving an email message, the email message being generated by a computing device; detecting whether a condition associated with the email message is satisfied, the condition including a condition for detecting whether the email message is sent by an automailer that is executing on the computing device; forwarding the email message to an email server, when the condition is satisfied; and discarding the email message, when the condition is not satisfied.

According to aspects of the disclosure, a system is provided, comprising: a memory; and at least one processor operatively coupled to the memory, the at least one processor being configured to perform the operations of: receiving an email message, the email message being generated by a computing device; detecting whether a condition associated with the email message is satisfied, the condition including a condition for detecting whether the email message is sent by an automailer that is executing on the computing device; forwarding the email message to an email server, when the condition is satisfied; and discarding the email message, when the condition is not satisfied.

According to aspects of the disclosure, a non-transitory computer-readable medium is provided that stores one or more processor-executable instructions, which, when executed by at least one processor, cause the at least one processor to perform the operations of: receiving an email message, the email message being generated by a computing device; detecting whether a condition associated with the email message is satisfied, the condition including a condition for detecting whether the email message is sent by an automailer that is executing on the computing device; forwarding the email message to an email server, when the condition is satisfied; and discarding the email message, when the condition is not satisfied.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
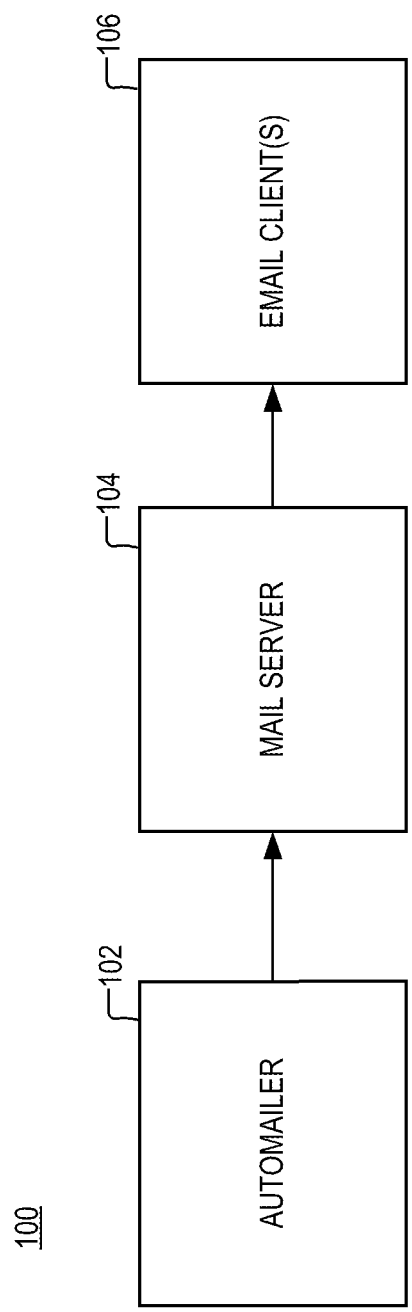
FIG. 1 is a diagram of an example of a system, according to aspects of the disclosure.

FIG. 1 is a diagram of an example of an email system 100, according to the prior art. As illustrated, the email system 100 may include an automailer 102, an email server 104, and one or more email clients 106. The automailer 102 may include any software that is configured to send unauthorized email messages. An unauthorized email message may include a spoofed email message, a phishing email message, a spam email message, and/or another similar message. In operation, the automailer 102 may send an unauthorized email message to one or more of the email clients 106 by sending the email message to the email server 104 first. Upon receiving the email message, the email server 104 may distribute the email message to the one or more email clients 106. In the example of FIG. 1, the email system 100 lacks the capability to detect unauthorized email messages and prevent their dissemination.

Figure 2:
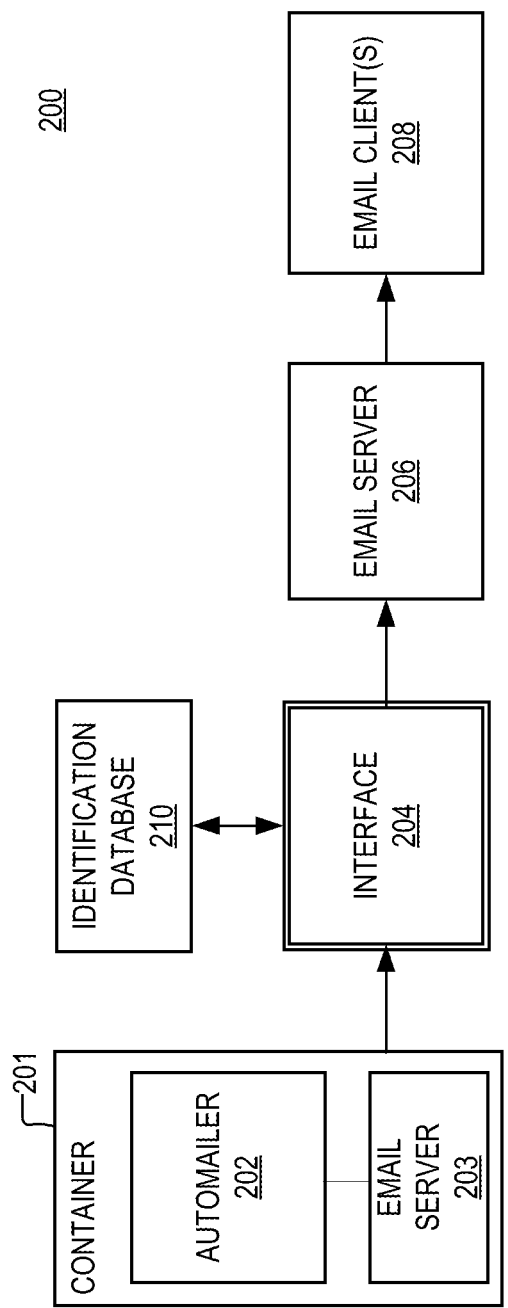
FIG. 2 is a diagram of an example of a system, according to aspects of the disclosure.

FIG. 2 is a diagram of an email system 200 that is provided with a capability to detect the transmission of unauthorized email messages and prevent it. The email system 200 may include a container 201, an interface 204, an email server 206, email clients 208 and an identification database 210. The capability to detect unauthorized email messages is provisioned, at least in part, by the interface 204.

The container 201 may be configured to encapsulate (and execute) an automailer 202 and an email server 203. The container 201 may include a virtual machine, a docker container, a microservice container, and/or any other unit of software that packages code and all (or at least some) of its dependencies for executing at least one of the automailer 202 and the email server 203. The email server 203 may include a Simple Mail Transfer Protocol (SMTP) server and/or any other suitable type of email server. The automailer 202 may be configured to use the email server 203 to send unauthorized email to the email clients 208 and/or the email server 206.

The email server 206 may include one or more of an SMTP server and/or any other suitable type of email server. According to the example of FIG. 2, the email server 206 is an SMTP server. However, the preset disclosure is not limited thereto. The email server 206 may be configured to receive messages from the email server 203 and store the messages in inboxes that correspond to email addresses that are being accessed with the email clients 208.

Figure 3:
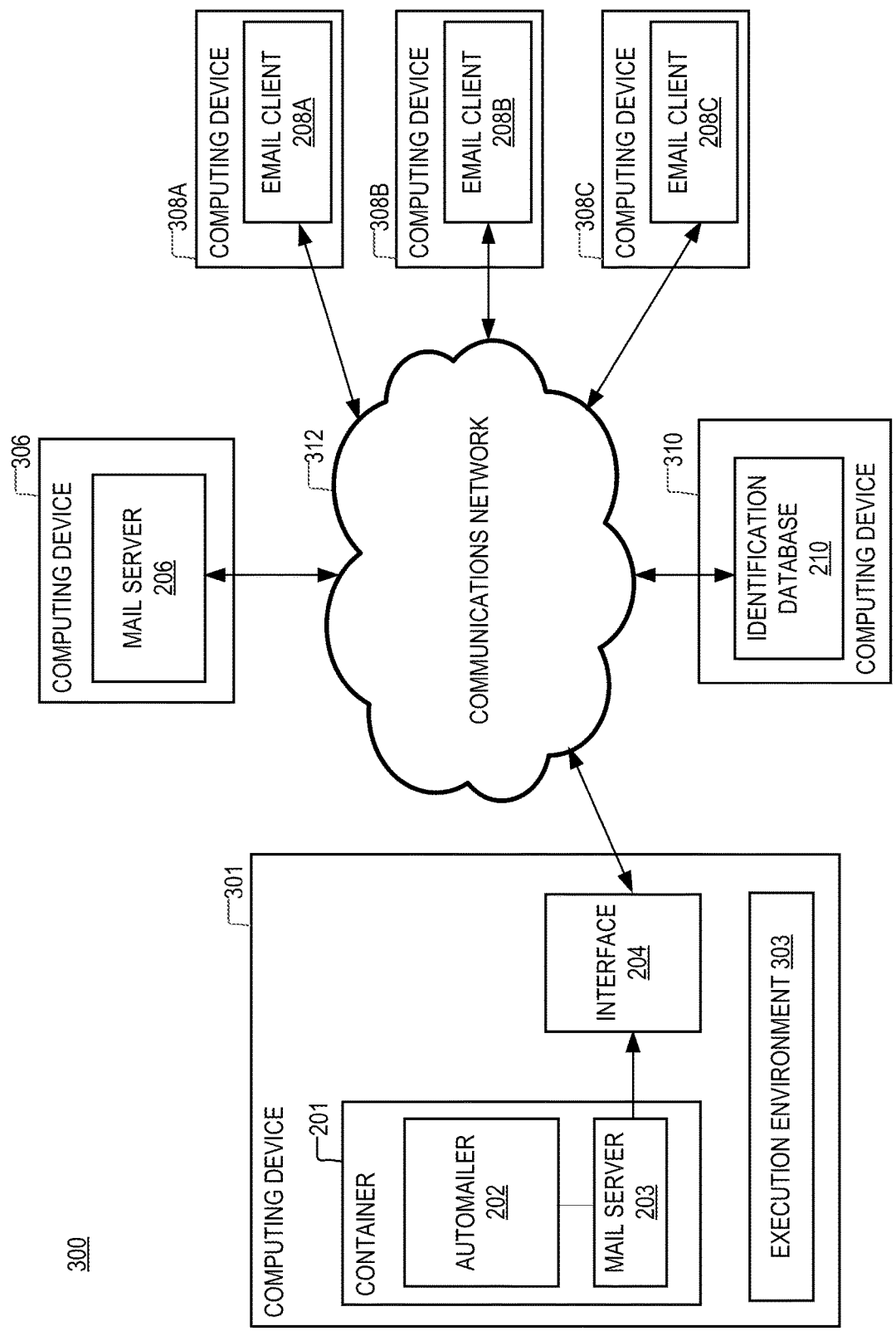
FIG. 3 is a diagram of an example of a system, according to aspects of the disclosure.

The email clients 208 may include email clients 208A-C (shown in FIG. 3). Each of the email clients 208 may be associated with a different respective email address. Each respective email address may be associated with a corresponding inbox on the email server 206. Each respective email address may belong to a respective user.

The identification database 210 may include a user directory that identifies a plurality of users. In some implementations, the identification database 210 may be configured to operate in accordance with the Lightweight Directory Access Protocol (LDAP). In some implementations, the user directory the users directory may include an employee directory that identifies all (or at least some) employees in a company.

FIG. 3 is a diagram of an example of a hardware system 300 that is configured to implement the email system 200. As illustrated, the hardware system 300 may include a computing device 301, a computing device 306, computing devices 308A-C, and a computing device 310, which are coupled to one another via a communications network 312. The communications network 312 may include one or more of a local area network (LAN), a wide area network (WAN), a long term evolution (LTE) network, a wireless network, the Internet, and/or any other suitable type of communications network.

The computing device 301 may include a desktop computer, a laptop computer, and/or any other suitable type of computing device. In some implementations, the computing device 301 may be the same or similar to the computing device 1000, which is discussed further below with respect to FIG. 10. According to the example of FIG. 3, the computing device 301 is configured to execute the container 201 and the interface 204. The container 201 and the interface 204 may be executed in the memory space of an execution environment 303. The execution environment 303 may include one or more of an operating system, a hypervisor, a Docker production environment, a microservice production environment, and/or any other suitable type of execution environment. Although in the example of FIG. 3 the container 201 and the interface 204 are executed on the same computing device, it will be understood that alternative implementations are possible in which the container 201 and the interface 204 are executed on different computing devices. For example, the interface 204 may be executed on the same computing device as the email server 206 or on another computing device that lies on the a communications path between the email server 206 and the computing device 301.

The computing device 306 may be configured to execute the email server 206. According to the example of FIG. 3, a computing device 308A is configured to execute an email client 208A, a computing device 308B is configured to execute an email client 208B, and a computing device 308C is configured to execute an email client 208C. The computing device 310 may be configured to execute the identification database 210. Each of the computing devices 306, 308A-C, and 310 may be the same or similar to the computing device 1000, which is discussed further below with respect to FIG. 10.

According to the example of FIG. 3, the hardware system 300 is part of an enterprise network that is used for the exchange of internal communications within a company. The container 201, along the automailer 202 and the email server 203, is instantiated by malware for the purpose of transmitting unauthorized email messages to employees of the company (e.g., the owners of the email addresses that are being accessed with email clients 208), as well as to other recipients. An unauthorized email message may include one or more of a spoofed email, a phishing email, a counterfeit email, a spam email, and/or any other email that is sent by the automailer. According to the present example, an automailer may include any software for sending unauthorized email messages. According to the example of FIG. 3, the automailer 202 uses the email server 203 to send unauthorized email messages. Although the email server 203 is depicted as an entity that is separate from the automailer 202, in some implementations the email server 203 may be integrated into the automailer 202.

As noted above, the container 201, along with the automailer 202 and the email server 203, may be instantiated by malware that has found its way into the computing device 301. Although the malware is being described as a separate entity, in some implementations, the malware may include code that is part of the automailer 202, which allows the automailer 202 to replicate itself. In one example, once the malware is running on the computing device 301, the malware may execute the following chain of attack: (1) the malware may instantiate, on the computing device 301, a plurality of containers, such as the container 201, (2) the malware may execute a different respective download of an execution file of the email server 203 to each of the containers, (3) the malware may execute an instance of the email server 203 in each of the containers, and (4) the malware may use each instance of the email server 203 to send unauthorized email messages.

Each of the containers may have a different Internet Protocol (IP) address. In this regard, the malware may instantiate multiple containers in order to conceal that unauthorized email messages are coming from the same device, and defeat any IP blocking mechanisms which might be employed in the hardware system 300 (and which react to spikes in email traffic from the same IP address). Each of the unauthorized emails may identify a fictitious sender (e.g., each of the unauthorized emails may include a spoofed sender email address and/or a spoofed sender name that is associated with the sender email address).

According to the example of FIG. 3, the hardware system 300 is configured such that all outgoing traffic originating from the computing device 301, and destined for the email server 206, first passes through the interface 204 before reaching the email server 206. The interface 204 may include software for detecting and blocking unauthorized email messages that are being sent by the computing device 301 to the email server 206.

The interface 204 may employ at least one of several techniques to detect and block unauthorized email messages. For example, when the interface 204 receives an email message from the computing device 301 (which is destined for the email server 206), the interface 204 may block the email message if a large number of containers is instantiated on the computing device 301. Doing so may break the malware's chain of attack at stage 1. As another example, when the interface 204 receives an email message from the computing device 301 (which is destined for the email server 206), the interface 204 may block the email message if the executable file for the email server 203 has been downloaded many times to the computing device 301. Doing so may break the malware's chain of attack at stage 2. As yet another example, when the interface 204 receives an email message from the computing device 301 (which is destined for the email server 206), the interface 204 may block the email message if the email message identifies a fictitious sender. To determine whether the sender of an email is fictitious, the malware may verify an identifier for the sender against the identification database 210. If the identifier is not listed in the identification database 210, the interface 204 may determine that the sender is fictitious. A sender identifier may include one or more of: an email address of the sender, a first name of the sender, a last name of the sender, a nickname of the sender, etc. As yet another example, when the interface 204 receives an email message from the computing device 301 (which is destined for the email server 206), the interface 204 may block the email message if a signature of the received message does not match the signature of a preapproved message.

Figure 4:
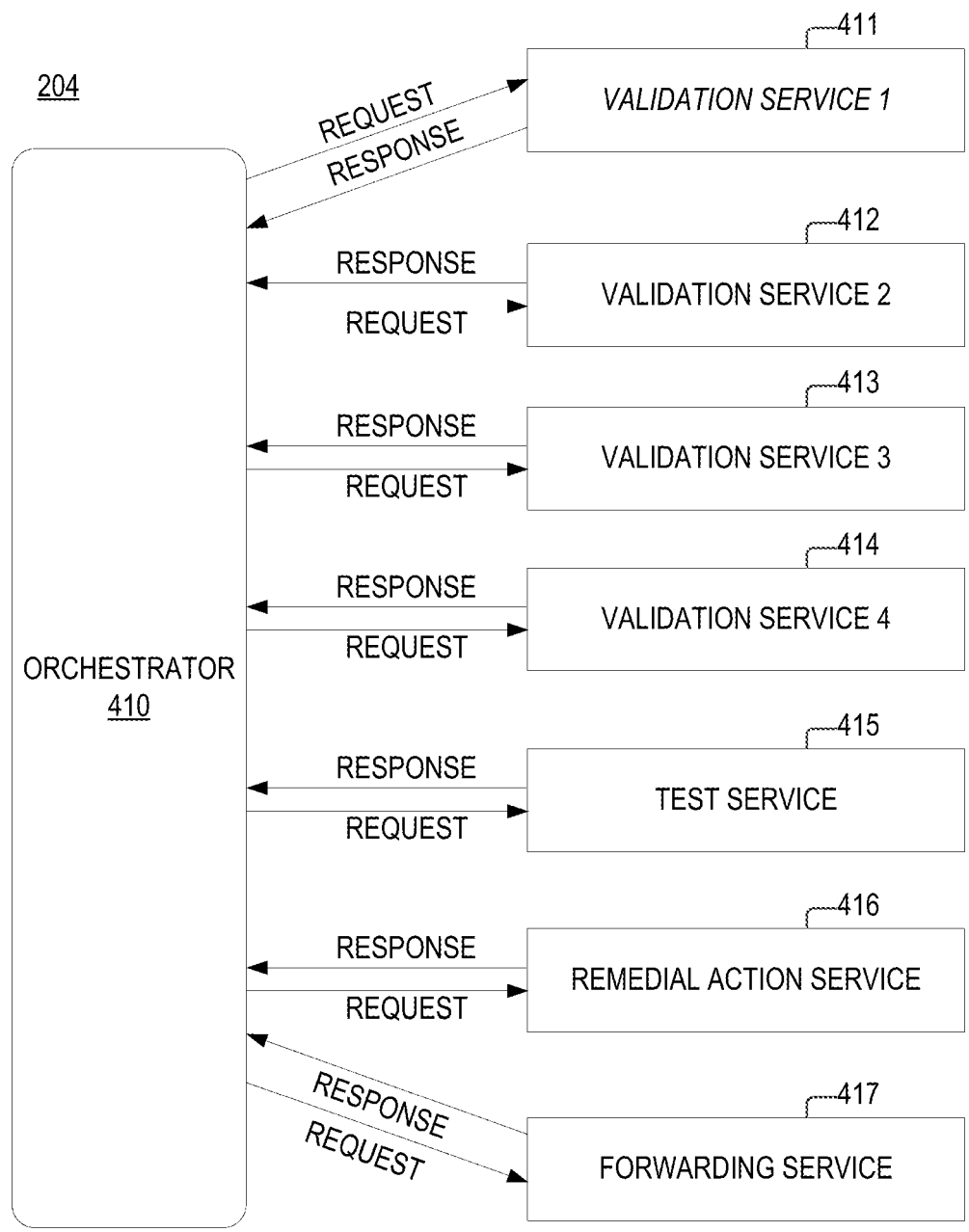
FIG. 4 is a diagram of an example of an interface, according to aspects of the disclosure.

FIG. 4 is a diagram of a microservice architecture for implementing the interface 204 in accordance with one particular implementation. As illustrated, the interface 204 may include an orchestrator 410, a validation service 411, a validation service 412, a validation service 413, a validation service 414, a testing service 415, a remedial action service 416, and a forwarding service 417.

The validation service 411 may include a microservice that is configured to determine whether the sender of an email message is fictitious (e.g., the validation service 411 may detect whether the email message includes a spoofed sender email address or a spoofed user name that is associated with the sender email address). In operation, the validation service 411 may receive, from the orchestrator 410, an execution request. The execution request may include an email message (which is desired to be validated) and/or an identifier corresponding to the sender of the email message. Next, the validation service 411 may retrieve the identifier of the sender of the email message from the execution request (and/or the email message). Next, the validation service 411 may submit a query, to the identification database 210, which contains the identifier of the sender of the email message. Next, the validation service 411 may receive a response from the identification database 210, which indicates whether the identifier of the sender of the email message is listed in a directory that is managed by the identification database 210. If the response from the identification database 210 indicates that the sender of the email message is listed in the directory, the validation service 411 may return TRUE to the orchestrator 410. Otherwise, if the response from the identification database 210 indicates that the sender of the email message is not listed in the directory, the validation service 411 may return FALSE to the orchestrator 410.

The validation service 412 may include a microservice that determines if an executable file for the email server 203 is downloaded many times on the computing device 301. The predetermined software may include one or more of an email server, and/or an email client. In some implementations, the number of downloads of the predetermined software may be determined by counting the number of file downloads from a server that is known to serve as a repository for the software. In operation, the validation service 412 may receive an execution request from the orchestrator 410. Next, the validation service 412 may determine a count of downloads, of the predetermined software, that have been performed by the computing device 301. If the count is below a threshold, the validation service 412 may return TRUE. Otherwise, if the count is greater than or equal to the threshold, the validation service 412 may return FALSE.

The validation service 413 may include a microservice that determines if a large number of containers is instantiated on the computing device 301. In operation, the validation service 413 may receive an execution request from the orchestrator 410. Next, the validation service 413 may determine a count of containers that are instantiated on the computing device 301, which also include (or execute) an email server. If the count is below a threshold, the validation service 412 may return TRUE. Otherwise, if the count is greater than or equal to the threshold, the validation service 412 may return FALSE.

The validation service 414 may include a microservice that is configured to compare a signature of an outgoing email (that is sent by the computing device 301) to a list of signatures of emails whose forwarding to the email server 206 is permitted. In operation, the validation service 414 may receive, from the orchestrator 410, an execution request. The execution request may include email source code that is part of (or otherwise associated with) an email message. The email source code may include a script, which, when executed by the email server 206 (or another email server), causes the email server 206 to disseminate the email message to a plurality of recipients. Next, the validation service 414 may generate a signature of the email source code. Next, the validation service 414 may compare the generated signature to a list of signatures. Each of the signatures on the list may correspond to an email that is pre-approved for forwarding by the email server 206 (e.g., to the email addresses associated with email clients 208, etc.). If the generated signature matches any of the signatures on the list, the validation service 414 may return TRUE. Otherwise, if the generated signature does not match any of the signatures on the list, the validation service 412 may return FALSE.

The testing service 415 may include a service that is configured to test the configuration of the email server 206 by transmitting a test email message via the email server 206. In some respects, the test email message may include an email message that is arranged to be rejected by the email server 206, if the email server 206 is configured to operate in accordance with one or more desired security policies. If the email server 206 is improperly configured to operate as an open relay (i.e., without practicing any authentication (or examination) of outgoing email traffic), the email will be delivered (or forwarded), and the testing service 415 will receive an acknowledgement from the email server 206. On the other hand, if the email server 206 is properly configured to perform authentication (or examination) of outgoing email traffic, the test email message will be rejected by the email server 206, and the testing service 415 will receive an error message from the email server 206. In operation, the testing service 415 may receive an execution request from the orchestrator 410. Next, the testing service 415 may transmit the test email message to the email server 206. If the testing service 415 receives, from the email server 206, an acknowledgement that the test email message has been delivered (or forwarded), the testing service 415 may return FALSE to the orchestrator 410. If the testing service 415 receives, from the email server 206, an indication that the test email could not be delivered (or forwarded), the testing service 415 may return TRUE to the orchestrator 410.

The remedial action service 416 may include a microservice that is executed, by the orchestrator 410, when any of the validation services 411-414 returns FALSE with respect to a particular email message that is outgoing from the computing device 301. In some implementations, when executed, the remedial action service 416 may block a sender of the particular outgoing email. Additionally or alternatively, in some implementations, when executed, the remedial action service or notify the owner of the computing device 301 that the computing device 301 is sending unauthorized emails.

The forwarding service 417 may include a microservice for forwarding email messages. In operation, the forwarding service 417 may receive, from the orchestrator, a request to forward an email message. The email message may be one that is transmitted by the computing device 301 and/or the automailer 202. Next, in response to the request, the forwarding service 417 may determine a recipient (a final recipient or an intermediate recipient) for the email message (e.g., the email server 206) and forward the email message to the determined recipient. In some implementations, the recipient may be determined based on information that is contained in the header of the email message.

Figure 5:
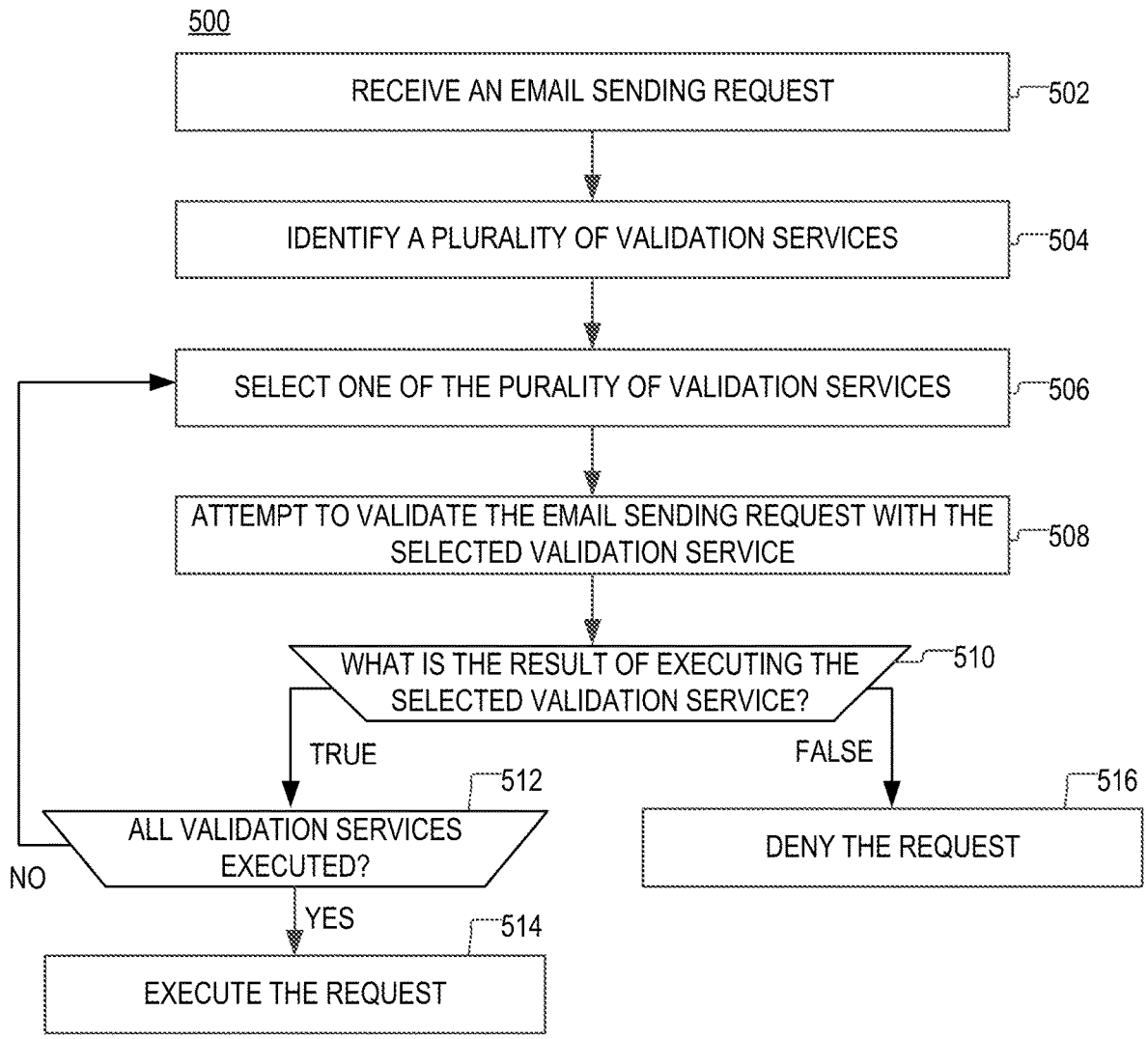
FIG. 5 is a flowchart of an example of a process, according to aspects of the disclosure.

FIG. 5 is a flowchart of an example of a process 500 that is performed by the orchestrator 410, according to aspects of the disclosure.

At step 502, the orchestrator 410 receives an email sending request from the computing device 301. According to the present example, the email sending request includes an email message that is generated by the automailer 202 and/or email server 203. The email message may include a text message (and/or an image or other attached media) and/or email source code.

At step 504, the orchestrator 410 identifies a plurality of validation services. According to the present example, the orchestrator 410 detects that validation services 411-414 are available to the orchestrator 410.

At step 506, the orchestrator 410 selects one of the identified validation services, which has not been executed in a previous iteration of step 506.

At step 508, the orchestrator 410 transmits an execution request to the selected execution service. For example, if validation service 411 is the selected service, the execution request may include the email message or an identifier of a sender of the email message. If the validation service 412 is the selected validation service, the execution request may include a request to determine if a count of downloads of predetermined software to the computing device 301 is below a threshold. If the validation service 413 is the selected service, the execution request may include a request to determine whether a count of containers that are instantiated on the computing device 301 is below a threshold. If validation service 414 is the selected service, the execution request may include a request to validate a signature of the email message.

At step 510, the orchestrator 410 determines a value that is returned by the selected validation service, in response to the execution request (transmitted at step 508). If the value is TRUE, the process 500 process to step 512. If the value is FALSE, the process 500 proceeds to step 516.

At step 512, the orchestrator 410 detects whether all validation services (identified at step 504) have been executed. If there are validation services that remain to be executed, the process 500 returns to step 506 and another one of the validation services is selected. If all validation services have been executed, the process 500 proceeds to step 514.

At step 514, the orchestrator 410 executes the email sending request (received at step 502). Executing the request includes transmitting an execution request to the forwarding service 417, to forward the email message (that is associated with the email sending request) to the email server 206 or another recipient. At step 516, the orchestrator 410 denies the request (received at step 502). Denying the request may include discarding the request, without forwarding it to any recipient. Additionally or alternatively, in some implementations, denying the request may include executing the remedial action service 416 to block a sender of the request (e.g., block an email address or an IP address associated with the sender) or notify a user of the computing device 301 that the computing device 301 is possibly used (by malware) to send unauthorized email messages.

Although not shown in FIG. 5, in some implementations, the orchestrator 410 may receive, from the computing device 301, a request to test whether the email server 206 is configured securely. Next, the orchestrator 410 may transmit an execution request to the test service 415. Next, the orchestrator 410 may receive a return value from the test service 415. And finally, the orchestrator 410 may forward the return value to the computing device 301. The computing device 301 may then display an indication of the return value to its user.

Although in the example of FIGS. 4-5 the interface 204 has a microservice architecture, the present disclosure is not limited to any specific implementation of the interface 204. In this regard, in some implementations, the actions performed by validation services 411-414 may be performed by another type of software component. In some implementations, the hardware system 300 may be part of the computer network of a company, and the identification database 210 may manage a directory of all (or at least some of the employees of the company). In such implementations, by comparing email senders against the directory, the validation service 411 may prevent dissemination of spoofed emails within the company network. Similarly, by comparing signatures of outgoing emails to signatures of preapproved emails, the validation service 414 may ensure that only emails whose content is approved are exchanged on the company network.

Although in the example of FIGS. 2-3 the automailer 202 and the email server 203 are executed in a container, in some implementations they may be executed without the use of containers. Although the example of FIGS. 2-3 assumes that multiple instances of the automailer 202 and the email server 203 may be executed on the computing device, in some implementations, only one instance of the automailer 202 and/or email server 203 may be executed on the computing device 301. Although the example of FIGS. 2-5 are presented in the context of filtering email traffic from the computing device 301, it will be understood that the interface 204 may be configured to monitor email traffic (for the email server 206) that originates from any computing device.

Figure 6:
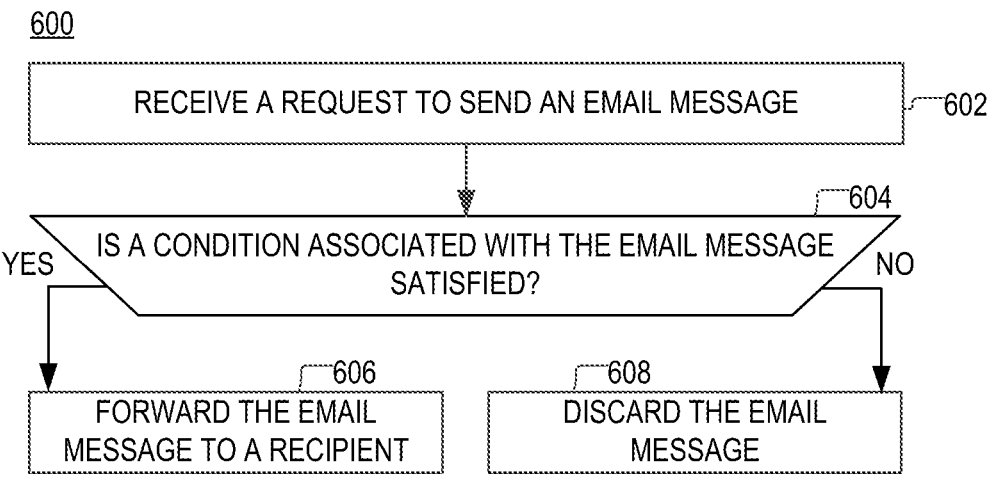
FIG. 6 is a flowchart of an example of a process, according to aspects of the disclosure.

FIG. 6 is a flowchart of an example of a process 600, according to aspects of the disclosure. According to the example of FIG. 6, the process 600 is performed by the interface 204. However, alternative implementations are possible in which the process 600 is performed by another entity, such as the email server 203.

At step 602, a request is received to send an email message to a recipient. The request is received from a computing device, such as the computing device 301. The request may include an email message. The email message may be a single-recipient email message, and it may identify a recipient email for the email message and a sender email for the email message. Additionally or alternatively, the message may be multi-recipient mail message, and it may include email source code, which, when executed by a mail server, causes the email server to send the email message to multiple recipients at once.

At step 604, a determination is made if the message satisfies a predetermined condition. If the predetermined condition is satisfied, the process 600 proceeds to step 606. If the condition is not satisfied, the process 600 proceeds to step 608.

In some implementations, detecting whether the predetermined condition is satisfied may include detecting whether a sender of the email message is identified in a database, such as the database 210. If the sender is identified in the database, the predetermined condition is deemed satisfied. If the sender is not identified in the database, the predetermined condition is deemed not satisfied. Additionally or alternatively, in some implementations, detecting whether the predetermined condition is satisfied may include executing one or more of processes 700, 800, and 900, which are discussed further below with respect to FIGS. 7, 8, and 9, respectively.

At step 606, the message is forwarded to a recipient. The recipient may include an email server, such as the email server 206. In some implementations, recipient may be a "final destination" email server that manages the inbox of an email address to which the email message is directed. Additionally or alternatively, in some implementations, the recipient may be a "next hop" email server that would forward the message to another email server, upon receiving it.

At step 608, the email message is discarded. When the email message is discarded, the email message is blocked, and not forwarded to a recipient. In other words, discarding the email message prevents the email message from reaching its recipient. In some implementations, when the message is discarded a sender of the message may be blocked and/or an alert may be generated to the owner of the computing device indicating that his or her computer is used to send unauthorized emails.

Figure 7:
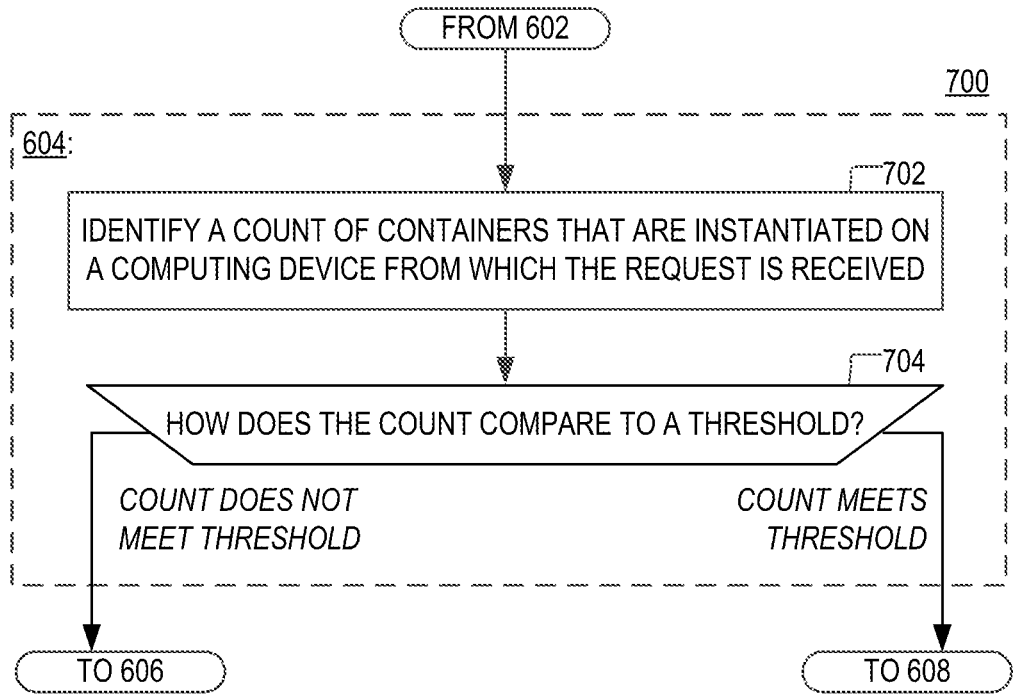
FIG. 7 is a flowchart of an example of a process, according to aspects of the disclosure.

FIG. 7 is a flowchart of an example of a process 700 for detecting whether a condition associated with an email message is satisfied, as specified by step 604 of the process 600.

At step 702, a count of containers is determined that are (i) instantiated on the computing device from which the request to send an email message is received at step 602, and (ii) which are executing (or otherwise include) software for sending email messages. According to the present example, the software application is a mail server, however, the present disclosure is not limited thereto. As noted above, whether a container includes a predetermined software application, may include detecting whether the memory space of the container includes a predetermined file (e.g., email_server.exe) or a predetermined directory (e.g., "./Program Files/Mail Server/") that is associated with the predetermined software application. In some implementations, the count of containers that are instantiated on the computing device includes: (i) a count of non-nested containers that are instantiated in an execution environment, such as the execution environment 303, and (ii) a count of nested containers that are instantiated on the computing device. A nested container, according to the present example, includes a container that is instantiated in the memory space of another container.

At step 704, the count is compared to a threshold a threshold. If the count does not meet the threshold (e.g., if the count is less than the threshold), the process 700 proceeds to step 606 (shown in FIG. 6). Otherwise, if the count meets the threshold (e.g., if the count is greater than the threshold), the process 700 proceeds to step 608 (shown in FIG. 8).

Figure 8:
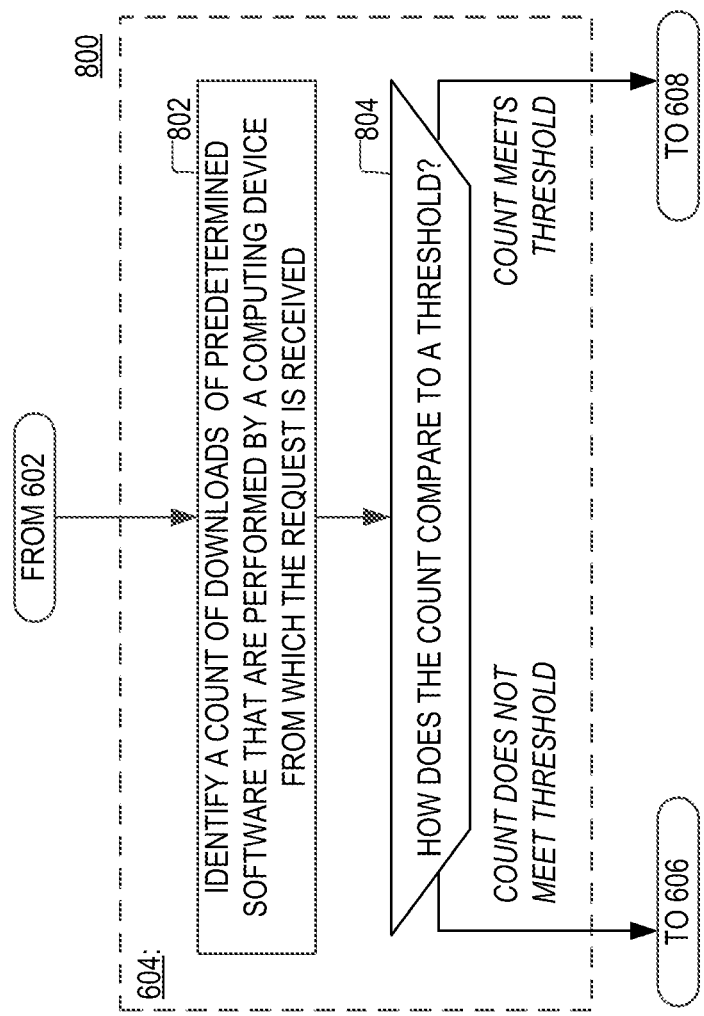
FIG. 8 is a flowchart of an example of a process, according to aspects of the disclosure.

FIG. 8 is a flowchart of an example of a process 800 for detecting whether a condition associated with an email message is satisfied, as specified by step 604 of the process 600.

At step 802, a count of downloads of software for sending email messages is determined, wherein the downloads are downloads performed by the computing device from which the request is received at step 502. According to the present example, the software includes a mail server, however, the present disclosure is not limited thereto. Determining the count of downloads may include determining how many times the software has been downloaded on the computing device during a predetermined time period (e.g., during the last 1 hour). In some implementations, determining the count of downloads may include determining how many downloads are performed from a location that is recognized as a repository for the software. In some implementations, the count of downloads may be determined by examining the memory of the computing device from which the request is received at step 502. Additionally or alternatively, in some implementations, the count of downloads may be determined by monitoring network traffic that is outgoing and/or incoming to the computing device.

At step 804, the count is compared to a threshold. If the count does not meet the threshold (e.g., if the count is less than the threshold), the process 800 proceeds to step 606 (shown in FIG. 6). Otherwise, if the count meets the threshold (e.g., if the count is greater than the threshold), the process 800 proceeds to step 608 (shown in FIG. 6).

Figure 9:
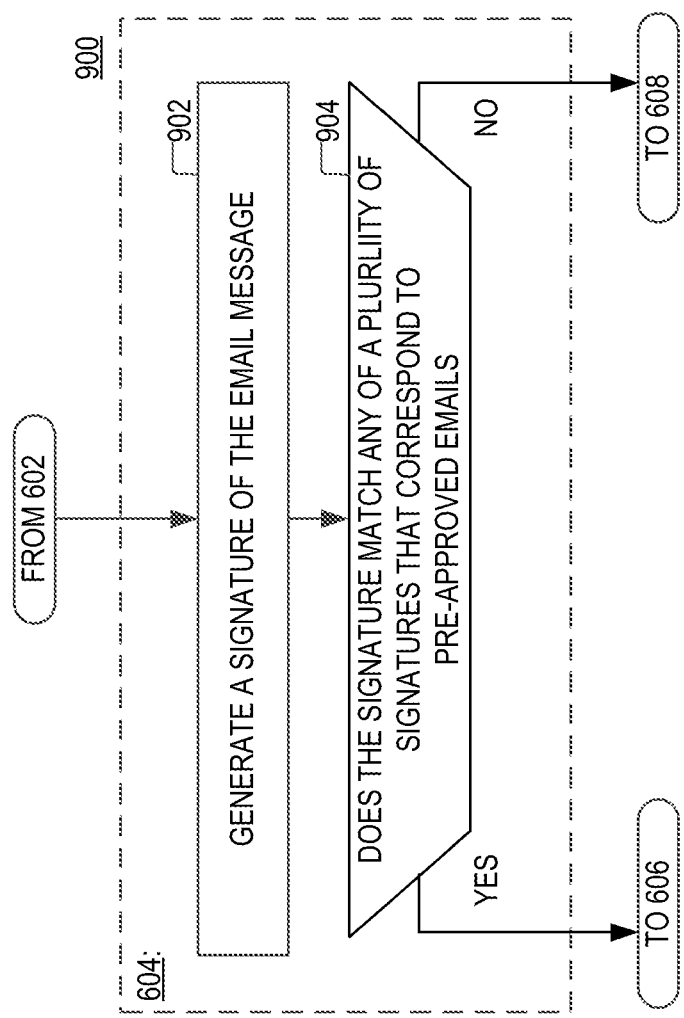
FIG. 9 is a flowchart of an example of a process, according to aspects of the disclosure.

FIG. 9 is a flowchart of an example of a process 900 for detecting whether a condition associated with an email message is satisfied, as specified by step 604 of the process 600.

At step 902, a signature of the email message is generated. The signature may include a signature of text that is part of the email message. Additionally or alternatively, the signature may include a signature of email source code that is part of the email message At step 904, a determination is made if the generated signature matches any of a plurality of pre-approved signatures. Each of the preapproved signatures may correspond to a respective email that is authorized to be forwarded (at step 606). If the generated signature matches any of the pre-approved signatures, the process 900 proceeds to step 606 (shown in FIG. 6). Otherwise, if the signature does not match any of the pre-approved signatures, the process 900 proceeds to step 608 (shown in FIG. 8).

Figure 10:
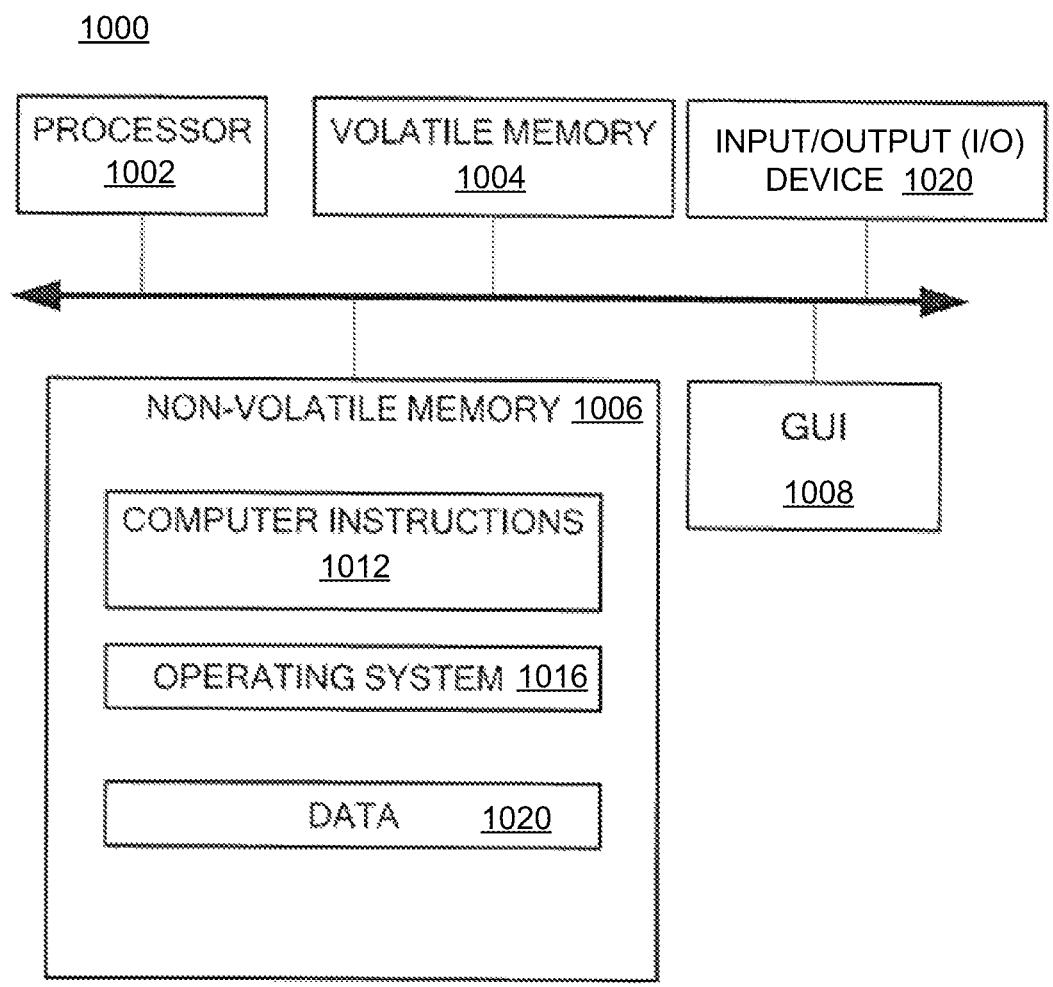
FIG. 10 is a diagram of an example of a computing device, according to aspects of the disclosure.

Referring to FIG. 10, computing device 1000 may include processor 1002, volatile memory 1004 (e.g., random-access memory), non-volatile memory 1006 (e.g., a hard disk drive, a solid-state drive such as a flash drive, a hybrid magnetic and solid-state drive, etc.), graphical user interface (GUI) 1008 (e.g., a touchscreen, a display, and so forth) and input/output (I/O) device 1020 (e.g., a mouse, a keyboard, etc.). Non-volatile memory 1006 stores computer instructions 1012, an operating system 1016 and data 1018 such that, for example, the computer instructions 1012 are executed by the processor 1002 out of volatile memory 1004. Program code may be applied to data entered using an input device of GUI 1008 or received from I/O device 1020.

Processor 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-10 are provided as an example only. At least some of the steps discussed with respect to FIGS. 1-10 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, Compact Disk Read-Only Memories (CD-ROMs), hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
   receiving an email message, the email message being generated by a computing device;
   detecting whether a condition associated with the email message is satisfied, the condition including a condition for detecting whether the email message is sent by an automailer that is executing on the computing device;
   forwarding the email message to an email server, when the condition is satisfied; and
   discarding the email message, when the condition is not satisfied,
   wherein detecting whether the condition is satisfied includes detecting a count of containers that are executed on the computing device and are configured to execute software for sending email messages, the condition is satisfied when the count does not meet a threshold, and the condition is not satisfied when the count meets the threshold.

2. The method of claim 1, wherein the software includes an email server.

3. A method comprising:
   receiving an email message, the email message being generated by a computing device;
   detecting whether a condition associated with the email message is satisfied, the condition including a condition for detecting whether the email message is sent by an automailer that is executing on the computing device;
   forwarding the email message to an email server, when the condition is satisfied; and
   discarding the email message, when the condition is not satisfied,
   wherein detecting whether the condition is satisfied includes detecting a count of downloads, to the computing device, of software for sending email messages, the condition is satisfied when the count does not meet a threshold, and the condition is not satisfied when the count meets the threshold.

4. The method of claim 3, wherein the software includes an email server.

5. A system, comprising:
   a memory; and
   at least one processor operatively coupled to the memory, the at least one processor being configured to perform the operations of:
   receiving an email message, the email message being generated by a computing device;
   detecting whether a condition associated with the email message is satisfied, the condition including a condition for detecting whether the email message is sent by an automailer that is executing on the computing device;
   forwarding the email message to an email server, when the condition is satisfied; and
   discarding the email message, when the condition is not satisfied,
   wherein detecting whether the condition is satisfied includes detecting a count of containers that are executed on the computing device and are configured to execute software for sending email messages, the condition is satisfied when the count does not meet a threshold, and the condition is not satisfied when the count meets the threshold.

6. The system of claim 5, wherein the software includes an email server.

7. A system, comprising:
   a memory, and
   at least one processor operatively coupled to the memory, the at least one processor being configured to perform the operations of:
   receiving an email messages, the email message being generated by a computing device,
   detecting whether a condition associated with the email message is satisfied, the condition including a condition for detecting whether the email message is sent by an automailer that is executing on the computing device;
   forwarding the email message to an email server, when the condition is satisfied; and
   discarding the email message, when the condition is not satisfied,
   wherein detecting whether the condition is satisfied includes detecting a count of downloads, to the computing device, of software for sending email messages, the condition is satisfied when the count does not meet a threshold, and the condition is not satisfied when the count meets the threshold.

8. The system of claim 7, wherein the software includes an email server.

* * * * *